United States Patent [19]

Garside

[11] 4,374,650
[45] Feb. 22, 1983

[54] BI-FLOW ROTARY KILN COAL GASIFICATION PROCESS

[75] Inventor: Peter G. Garside, Waukesha, Wis.

[73] Assignee: Allis-Chalmers Corporation, Milwaukee, Wis.

[21] Appl. No.: 264,479

[22] Filed: May 18, 1981

[51] Int. Cl.³ .............................................. C10J 3/06
[52] U.S. Cl. ...................................... 48/202; 48/203; 48/206
[58] Field of Search ................ 48/210, 202, 203, 206, 48/197 R, 122; 201/33, 34

[56] References Cited

U.S. PATENT DOCUMENTS

| | | | |
|---|---|---|---|
| 247,322 | 8/1981 | Egner | 48/122 |
| 1,121,906 | 12/1914 | Downs | 432/109 |
| 1,159,675 | 11/1915 | Hornsey | 48/202 |
| 1,214,164 | 1/1917 | Hornsey | 48/202 |
| 1,267,410 | 5/1918 | Hornsey | 48/DIG. 4 |
| 1,270,949 | 7/1918 | Hornsey | 48/203 |
| 1,273,474 | 7/1918 | Fleischer | 48/203 |
| 1,791,411 | 2/1931 | Hillebrand | 48/202 |
| 1,916,900 | 7/1933 | Vandegrift et al. | 201/35 |
| 3,661,370 | 5/1972 | Rossi | 263/33 R |
| 3,847,538 | 11/1974 | Rossi | 432/113 |
| 3,945,624 | 3/1976 | Rossi | 266/20 |
| 3,990,865 | 11/1976 | Cybriwsky et al. | 48/197 R |
| 4,070,149 | 1/1978 | Rossi | 432/109 |
| 4,150,953 | 4/1979 | Woodmansee | 48/197 R |
| 4,214,707 | 7/1980 | Flaherty | 239/553.5 |
| 4,244,705 | 1/1981 | Seidl et al. | 48/77 |
| 4,260,590 | 4/1981 | Weber | 423/226 |

FOREIGN PATENT DOCUMENTS 149049 5/1882 France.

OTHER PUBLICATIONS

W. W. Norton et al., "Coal Gasification Addition to Existing Plant Produces Low-BTU Gas for Retrofit Furnaces", Aug. 1981.
"Coal Gasification Systems", *Energy Systems Product News*, Oct. 1981.

Primary Examiner—William F. Smith
Attorney, Agent, or Firm—Arthur M. Streich

[57] ABSTRACT

A process is disclosed for gasifying solid coal particles in a rotary kiln that produces simultaneously and continuously two distinctly different fuel gas streams from the opposite ends of a single kiln. A relatively low temperature gas is discharged from the solids inlet end of the kiln, which contains substantially all tars produced by the process. A second of the gas streams is discharged from the solids discharge end of the kiln at approximately 1,900° F. and substantially tar-free. Heat is recovered from this tar-free gas after only a simple cleaning of particulate matter, as may be provided by a cyclone separator. The discharge of gas out the solids inlet end of the kiln and the gas discharged out the solids discharge end of the kiln, is adjustably proportioned relative to each other so that at least some high temperature tar-free gas will mix inside the kiln with the lower temperature tar-containing gas, in an amount sufficient to keep such mixed gases at a temperature high enough to avoid the tars condensing on equipment surfaces. Several process parameters are disclosed for adjusting the proportion of the gas flows out each end of the kiln to maintain the aforesaid condition of both gas streams.

8 Claims, 4 Drawing Figures

BI-FLOW ROTARY KILN COAL GASIFICATION PROCESS

BACKGROUND OF THE INVENTION

1. Field of the Invention

This invention relates to a dry process for gasifying coal or other carbonaceous material in a rotary kiln. In particular this invention relates to improvements in such a process as may be carried out in rotary kilns having gas outlets on both ends of the kiln and air-steam admitting ports extending radially through the shell of the kiln to rotate with the kiln and pass beneath a bed of coal in the kiln.

2. Description of the Prior Art

Coal gasification processes carried out in an inclined rotary kiln are known to have several advantages. Rotary kilns for coal gasification can (1) be built to very large scale; (2) throughput can be easily controlled by adjusting rotational speed; (3) feed material need not be screened to particular sizes since a rotary kiln handles chunks and very small fines; (4) ample room can be provided to accommodate swelling of caking coals; and (5) constant mixing of the coal charge due to kiln rotation provides substantially homogeneous temperatures within the bed at each location along the longitudinal axis of the kiln.

Coal gasification processes carried out in an inclined rotary kiln have been known at least since U.S. Pat. No. 247,322 to F. Egner dated Sept. 20, 1881; and such a process was disclosed as being carried out in a rotary kiln having gas ports extending radially therethrough in French Pat. No 149,049 of 1882. U.S. Pat. No. 1,121,906 to G. E. Downs dated Dec. 22, 1914 discloses a ported rotary kiln sealed for operation with pressurized air or other gas or vapor supplied through the ports in the kiln shell.

The first suggestion of a process by which two fuel gas streams of different composition may be produced in a single system, is believed to be found in U.S. Pat. No. 1,159,675 to J. W. Hornsey dated Nov. 9, 1915. The process of this 1915 Hornsey patent utilizes three rotary kilns, a first kiln for drying and preheating coal, a second kiln for educting gases at about 900° F. which contain condensible volatile matter (referred to as "coal gas"), and a third kiln for educting gases from coal at over 1,600° F. in an atmosphere of steam, with such gases substantially free of condensible volatile matter (and such gases being referred to as "water gas").

U.S. Pat. No. 1,214,164 to J. W. Hornsey dated Jan. 30, 1917 is perhaps the first disclosure of a coal gasifying rotary kiln having gas outlets on both ends of the kiln. This 1917 Hornsey patent discloses two processes that can be carried out with such a kiln. The first described process is for producing one gas, water gas, from a charge material that has been previously coked. The description of this water gas process states that steam input and water gas output may be from either end of the kiln or in any conbination. The second process described in this patent is a process for producing two gas streams, coal gas and water gas, in a single rotary kiln, with coal gas being discharged from the coal inlet end of the rotary kiln and the water gas being discharged from the ash discharge end of the kiln.

Hornsey patents U.S. Pat. No. 1,267,410 dated May 28, 1918 and U.S. Pat. No. 1,270,949 dated July 2, 1918 again both describe two processes. The first process described in each of these patents is a process in which gas is drawn off from the coal inlet end of a rotary kiln and the input of steam is increased or decreased to control gas temperature and gas composition. The second process described in each of these patents is a process in which a tar-free gas is produced by controlling an input of air to promote combustion, and this gas is discharged from the solids discharge end of the kiln. That process is described as providing air in an amount sufficient to convert carbon monoxide to carbon dioxide and produce heat in an amount that the tars are "raised to such a high temperature that they are converted into fixed gases." Such high temperatures are not specifically described therein, but it is known that to so convert such tars and at the same time operate the process efficiently (i.e., with a substantially complete conversion of coal to gas) the temperatures within the gasifier would be of the order of 2,500° F. to 3,300° F. Such operation has two disadvantages. First, such high temperatures are very hostile to the rotary kiln and its lining. Secondly, by such operation much of the energy contained in the coal is converted to unrecoverable sensible heat rather than the more desired conversion of the energy in the coal to latent chemical energy in a combustible fuel gas releasable as thermal energy upon combustion of the fuel gas. The conversion of much of the energy in the coal to sensible heat rather than latent chemical energy in the fuel gas in this Hornsey airblown rotary kiln process, means that the fuel gas produced, while free of tars, would have a very low latent chemical heating value and much lower than fuel gas produced by the present invention. If, on the other hand, this Hornsey process is operated to convert the tars to gases at significantly lower temperatures (e.g., about 1,900°–2,000° F.) the latent chemical heating value of the generated gas will be higher per unit volume of gas but the total chemical heating values (BTU's) educted per ton of coal will be much lower than that for the present invention.

As will appear from the description of the present invention to follow, the present invention may be considered as being an improvement to the processes disclosed in the aforesaid 1917 and 1918 patents to Hornsey.

Before proceeding with a description of the present invention, three other patents will be reviewed that relate to gasifying coal in a rotary kiln, and which were granted after the aforesaid Hornsey patents.

U.S. Pat. No. 1,916,900 to J. N. Vandegrift et al. dated July 4, 1933 discloses a rotary kiln with gas outlets on both ends. However, the process described in this patent is a relatively low temperature process (does not exceed 1,100° F.) to recover "coked residues" and "to convert lumps of semi-bituminous and cannel-coals and some bituminous coals into lumps of anthracite", and this process is not, therefore, designed to maximize eduction of fuel gas from the feed material.

U.S. Pat. No. 3,990,865 to A. Cybriwsky and G. T. Petersen, dated Nov. 9, 1976, discloses a rotary coal gasification kiln with radial ports carried by the rotating kiln shell for admitting air and steam to the interior of the kiln, either when the ports are passing beneath the bed of coal particles within the kiln or continuously as the ports are carried in this circular orbit around the bed of coal within the kiln.

U.S. Pat. No. 4,214,707 to T. W. Flaherty dated July 29, 1980 discloses an arrangement for fluid supply pipes, valves, ports and nozzles for ports, for injecting air and steam into a coal gasification kiln such as is described in Cybriwsky and Petersen U.S. Pat. No. 3,990,865 and or in the description to follow with regard to the present invention.

SUMMARY OF THE PRESENT INVENTION

The aforesaid Description of the Prior Art has been introduced by identifying five advantages that are possessed by all rotary kiln coal gasification processes, when compared to processes not carried on in rotary kilns. It is the object of the present invention to provide a rotary kiln coal gasification process that has additional and unique advantages, primary among which is that of producing fuel gases which in total educt from coal more of the heating values as latent chemical energy releasable as thermal energy upon combustion of the fuel gas, in equipment not associated with the production of gas from coal as, for example, a steam generating boiler, and with the production of sensible heat being limited to a rate at which substantial heat recovery for other economically justifiable uses can be achieved and to accomplish the foregoing without condensation of tars on equipment surfaces.

Another object of the present invention is to produce fuel gases from coal with the gases containing more of the heating values as latent chemical energy and less unrecoverable sensible heat, without the need for reacting the coal with pure oxygen, and without the need for process temperatures higher than about 2,000° F.

As will appear from the description to follow, the process of this invention does not attempt to totally avoid the production of tars and tar-laden fuel gas, but rather provides a unique and economically attractive process by which both tar-laden and tar-free gases are produced and the tar-free gas is in part utilized to maintain tar-laden gases at temperatures high enough to prevent condensation of tars on surfaces of gasifying equipment.

According to the present invention, the aforesaid objects of the invention are achieved by a process in which oxidizing gas and steam are blown through a preheated bed of carbonaceous material tumbling in a rotary kiln, at flow rates controlled to heat and educt from the material a tar-laden gas which is passed over incoming feed material to transfer a portion of sensible heat from such gas to preheat such incoming material and with such preheating gas thereafter being discharged out of the solids inlet end of the kiln, and a tar-free gas is produced from char of the carbonaceous material, and the tar-free gas is discharged out the solids discharge end of the kiln, at about 1,900° F. Such discharged gas flows are further adjustably proportioned relative to each other so that a portion of the tar-free gas at about 1,900° F. will mix with lower temperature tar containing gas flowing toward the solids inlet end of the kiln in an amount sufficient to keep such mixed gases at a temperature high enough to avoid the tars condensing on surfaces of the gasifying equipment. The remainder of the higher temperature gas stream is discharged tar-free from the solids discharge end of the kiln. There are according to this invention, process parameters for adjusting the proportion of the gas flows out each end of the kiln to maintain the aforesaid condition of both gas streams. Such process parameters may include: (1) maintaining the temperature of gases discharged from the solids inlet end of the kiln at about 1,000° F., and (2) maintaining a methane content in the gas discharged from the solids discharge end of the kiln from zero to about 0.1 percent. As will appear from examples hereinafter described, meeting such guidelines may require discharging a number of pounds of gas from the solids feed end of the kiln relative to a number of pounds of gas discharged from the solids discharge end of the kiln, in a range of ratios of from approximately 2:1 to 4:1 for bituminous coals; while for sub-bituminous coals without predrying it may be necessary to mix substantially 100% of the high temperature tar-free gas with the lower temperature tar-containing gas in order that such gas is discharged from the solids feed end of the kiln with entrained tars safely above condensation temperature.

With regard to the methane content parameter, it should perhaps be noted that devices are commercially available for monitoring the methane content of a gas stream, while no devices are currently available for monitoring tar content of gas on a continuous basis. However, it has been determined by the present inventor that when the methane content of gas discharged from the solids discharge end of the kiln exceed 0.1 percent, tars and other condensible hydrocarbons will then likely be found in the gas. Therefore, a measure of methane content provides an indication of the presence or absence of unwanted tars and other condensible hydrocarbons in the high temperature gas from the solids discharge end of the kiln.

BRIEF DESCRIPTION OF THE DRAWINGS

A manner in which the foregoing and other objects of the subject invention have been achieved, will become apparent as the following description is read in light of the attached drawings in which.

DESCRIPTION OF THE PREFERRED EMBODIMENT

Figure 1:
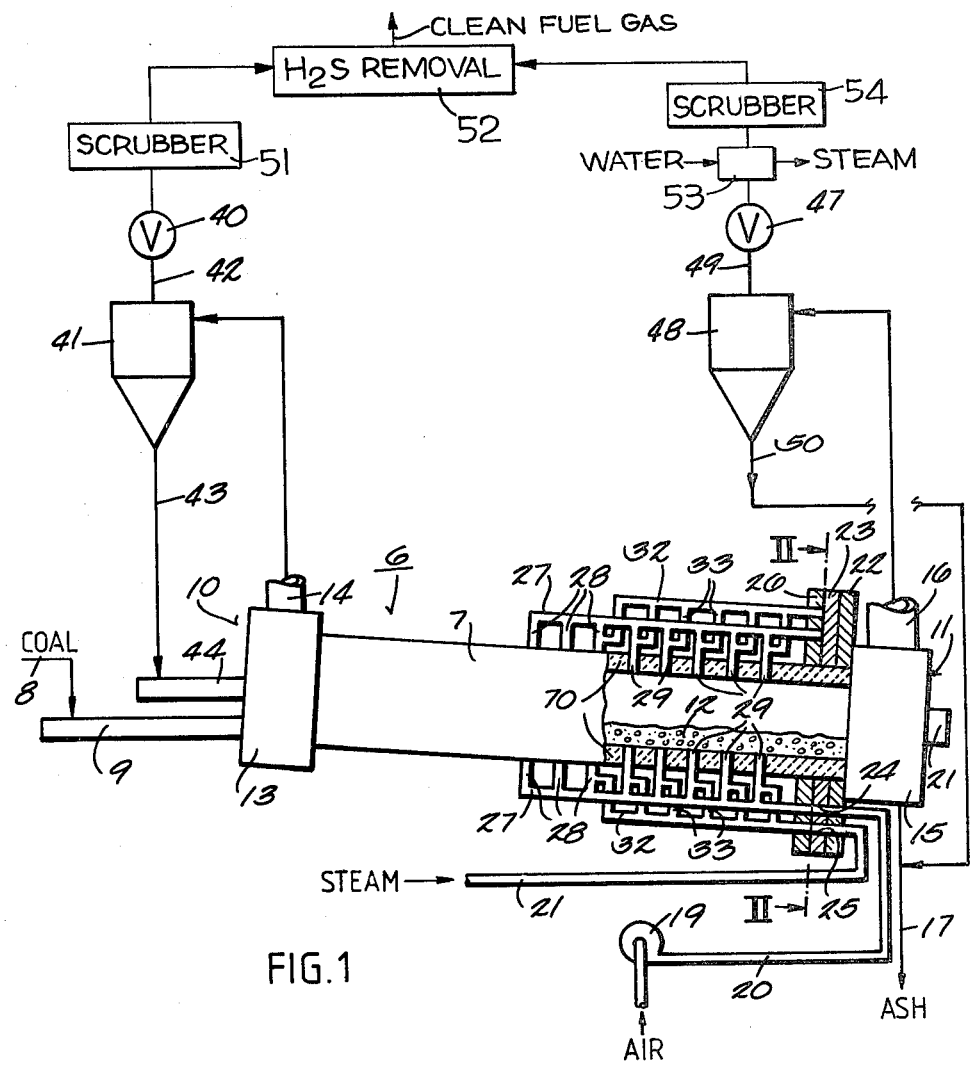
FIG. 1 is a general material/gas flow and apparatus diagram of the rotary kiln coal gasification process.

Referring to the accompanying drawings, a gasifier 6 is shown herein as including an inclined refractory lined rotary kiln shell 7. Coal or other solid carbonaceous material is fed from a delivery conduit 8 into an uphill end 10 of the kiln shell 7, through a feeder 9. Conventional means well known in the art may be provided to rotate the kiln shell 7. Since means for rotating a kiln shell form no part of this invention and are well known in the art, they are not shown in the drawings. The kiln shell 7 is inclined downwardly from the solid feed material inlet end 10 to a ash discharge end 11. This inclination together with the rotary action of the kiln shell 7 causes the coal to form a bed 12 within the refractory lined kiln shell 7 that slowly moves down the incline as it is gasified.

The solid feed material inlet end 10 of the kiln 7 is provided with a stationary hood 13 having a gas outlet conduit 14. The ash discharge end 11 of the kiln 7 is provided with a stationary hood 15. The ash discharge hood 15 has a gas outlet conduit 16 and an ash outlet passage 17. A fuel burner 21 is provided in the outlet hood 15 to preheat the kiln and the coal to operating temperature during startup. A burner, gas firing or any suitable type of fuel may be used for this purpose.

With a gasifier 6 operated, as will be described, with an above atmospheric pressure within kiln shell 7, the coal feeder 9 and ash outlet 17 may be constructed and arranged as shown in U.S. Pat. No. 4,244,705 Seidl et al. dated Jan. 13, 1981.

Figure 2:
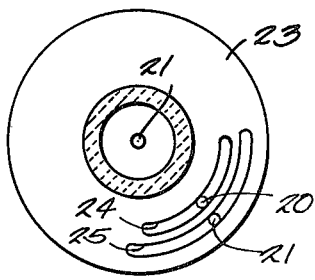
FIG. 2 is a view in cross-section of the ported rotary kiln shown in FIG. 1 taken along line II—II in FIG. 1.

FIGS. 1 and 2 of the drawings show diagrammatically an arrangement which will be described, for passing air and steam through ports in the refractory lined kiln 7 and through the bed of material 12 within the kiln. However, before proceeding with a description of the arrangement shown, attention is directed to the fact that in order to avoid an unnecessarily complicated description, the arrangement shown is a simple showing not intended to disclose a commercially acceptable arrangement. Commercially acceptable systems for delivering two gas steams (which may be air and steam) to a rotating kiln shell and through ports into the rotating kiln shell are known and are more likely to involve a two gas delivery system similar to that shown in U.S. Pat. No. 3,661,370 to E. F. Rossi dated May 9, 1972. Furthermore, if air and steam admission ports are to be opened only as the ports pass beneath a bed of material in the kiln, as is the presently preferred mode of operation of this invention, the valves in gas delivery conduits can be turned on and off when the ports arrive at selected positions in their orbital paths by valve operating cam and tripper systems such as are disclosed in Rossi U.S. Pat. Nos. 3,847,538 of Nov. 12, 1974; 3,945,624 of Mar. 23, 1976 and 4,070,149 of Jan. 24, 1978.

The simplified diagrammatic showing in FIGS. 1 and 2 of a system for delivering air and steam to the rotating kiln shell 7, includes an air pressurizing blower 19 connected to a delivery passage 20, a source of pressurized steam (not shown) and a steam delivery passage 21. The passages 20, 21 are connected to and open through a nonrotating mounting plate 22. A nonrotating manifold 23 abuts the plate 22 and as shown in FIG. 2 is provided with arcuate slots 24, 25. Abutting manifold 23, on a side opposite the nonrotating mounting plate 22, is a tube carrier 26 mounted on kiln shell 7 to rotate with kiln shell 7. A plurality of circumferentially spaced and axially extending tubes 27, 32 are mounted in tube carrier 26 with tubes 27, 32 projecting toward the solids inlet end 10 of kiln 7. Each of the tubes 27 is connected to a plurality of radial passages 28 which are in turn connected to ports 29 opening radially inward through kiln 7 and its refractory lining 7-a to communicate with the interior thereof and pass beneath the bed of material 12 therein, as kiln shell 7 rotates. As kiln 7 rotates, kiln 7 and tube carrier 26 carry tubes 27 past the arcuate slot 24 in the nonrotating manifold 23 to establish air flow communication from passage 20 through slot 24 into one or more of the tubes 27 being carried past slot 24. Air then flows from tubes 27 through radial passages 28 and ports 29 to perculate through the bed 12 of material in the kiln.

The steam delivery and distribution system, from passage 21 to the tubes 32 is similar to the air delivery and distribution system just described, and will now be described.

Each of the tubes 32 is connected to a plurality of radial passages 33 which are in turn connected to passages 28 and thereby to the ports 29. As kiln 7 rotates, kiln 7 and tube carrier 26 carry tubes 32 past the arcuate slot 25 in the nonrotating manifold 23 to establish steam flow communication from passage 21, through slot 25 into one or more of the tubes 32 being carried past slot 25. Steam then flows from tubes 32 through radial passages 33, 28 and ports 29 to perculate along with air, through the bed 12 of material in the kiln.

Valves (not here shown) may be provided in axially extending tubes 27, 32 and/or in radial passages 28, 33 and/or located in fluid supply pipes as shown in U.S. Pat. No. 4,214,707 to J. W. Flaherty dated July 29, 1980, in order to vary the pattern and number of ports 29 that are operative in the manner described, to provide air and steam flows as needed by different carbonaceous materials being gasified. Nozzles (not here shown) may be fitted in each of the ports 29 and may be of a construction as is also disclosed in the aforesaid U.S. Pat. No. 4,214,707.

As will appear from the description to follow, fuel gas is discharged simultaneously from the solids (coal) inlet end 10 of kiln 7 and from the solids (ash) outlet end 11 of kiln 7. A flow of off-gas from the solids feed end 10 of kiln 7 through gas outlet conduit 14, is controlled by a valve 40. The flow of off-gas through conduit 14 discharges into a particle-gas cyclone separator 41, with off-gas from cyclone separator 41 then flowing from separator 41 through a conduit 42 to a facility for further cleaning (in apparatus not shown). A facility for further cleaning the gas from conduit 42 may include a scrubber 51 which may be as is described in Chemical Engineers Handbook, Perry, 3rd Edition, 1950, McGraw-Hill Book Company, beginning at page 1034, and a hydrogen sulfide removal system 52 which may be as described in the aforesaid Handbook beginning at page 1577 or as described in U.S. Pat. Nos. 4,150,953 and 4,260,590. Particulates such as are removed from gases by the separator 41 may be recycled by passing those particulates through a conduit 43 to a feeder 44 (which may be of a construction and arrangement similar to that referred to with regard to feeder 9) and the particulates are returned to gasifier 6.

A flow of off-gas from the solids (ash) discharge end 11 of kiln 7 through conduit 16, is controlled by a valve 47. The flow of off-gas through conduit 16 discharges into a particle-gas cyclone separator 48, with off-gass free of particulates flowing from separator 48 through a conduit 49 to heat recovery apparatus 53 to recover heat from this gas stream as for example by generating steam. Gas from apparatus 53 passes to a scrubber 54 which may be such as described with regard to scrubber 51 and then to the hydrogen sulfide removal system 52. Gas from the hydrogen sulfide removal system 52 may be delivered to a steam boiler burner or combined cycle power plant (not shown). Particulates removed from gases by the separator 48 pass through conduit 50 to discharge into the ash outlet passage 17 for disposal in a suitable manner along with the ash discharged from kiln 7.

THE PROCESS OF THIS INVENTION

Figure 3:
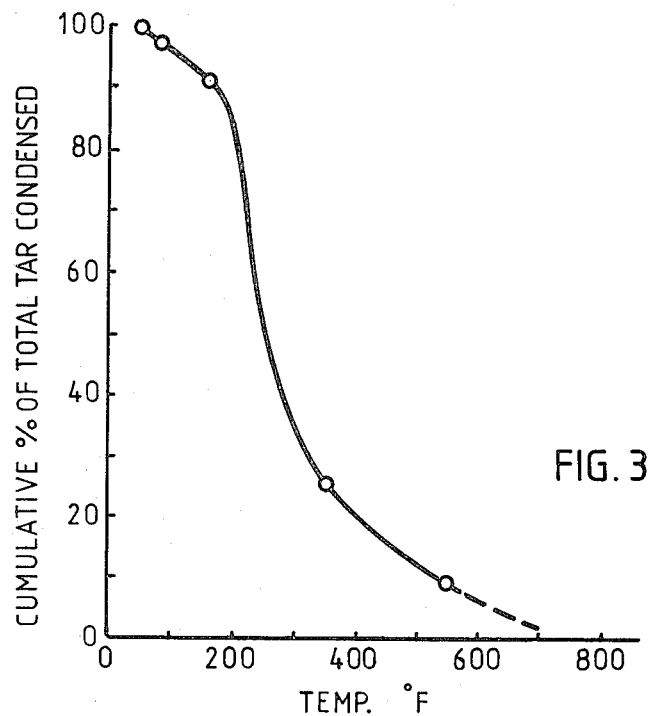
FIG. 3 is a graph depicting condensation of tar from a tar-containing gas stream.

A description of a process according to the present invention will begin with a description of the operation of a plant as thus far described with reference to FIGS. 1 and 2, and then will proceed with a more detailed description with additional reference to the graphs of FIGS. 3 and 4.

The operation of the apparatus shown in FIG. 1 is begun by first igniting burner 21 to preheat the rotating kiln refractory 70 and shell 7, the hoods 13, 15, and the product gas outlet conduits 14, 16. When the inner surface of the refractory 7a is heated to a temperature of between 1,500° to 1,800° F., particles of coal are fed through the feeder 9 into kiln 7. When the kiln is partially filled and a bed 12 of coal has essentially covered the length of the kiln, air and steam injection is begun through the ports 29 and the bed 12 as the ports 29 pass beneath the bed, and the burner 21 is turned off. The coal bed temperature moving down the incline of kiln 7 rapidly increases to 1,600° to 2,200° F. near the solids discharge end 11 of kiln 7 and the air to steam ratio injected through the ports 29 is adjusted to maintain the desired temperatures.

Air under pressure from blower 19 flows through passage 20, arcuate slot 24 in manifold 23 (also see FIG. 2) and into each axially extending tube 27 (shown only in FIG. 1) being carried past slot 24 by the rotation of kiln shell 7. From tubes 27 air passes through the radial passages 28, ports 29 and the bed of material 12.

Steam under pressure (from a steam generator not shown) flows through passage 21, arcuate slot 25 in manifold 23 (also see FIG. 2) and into each axially extending tube 32 (shown in FIG. 1 only) being carried past slot 25 by the rotation of kiln shell 7. From tubes 32 steam passes through the radial passages 33 that open into the passages 28 after which steam mixed with air passes through ports 29 and the bed of material 12. It should be noted, however, that the steam tubes 32 do not extend as far toward the feed end 10 of kiln 7, as do the air tubes 28, thereby providing for injecting only air into the bed before the injection of the mixed air and steam, for reasons explained later with reference to FIG. 4.

Steam and air pressures into the kiln 7 are adjusted to provide a gas pressure within the kiln which is at least 20 pounds per square inch, and preferably 60 to 180 pounds per square inch higher than ambient atmospheric pressure external of the kiln. The discharge of such pressurized gases from both ends 10, 11 of kiln 7 can, therefore, be controlled by adjusting valves 40, 47.

The process according to this invention, for gasifying solid coal particles in the bed 12 in rotary kiln 7, produces simultaneously and continuously two distinctly different fuel gas steams from the opposite ends of the single kiln 7. A first of the gas streams, which contains substantially all tars produced by the process, is generated as the coal is heated from about 400° F. to 1,600° F. and, if discharged from the solids inlet end 10 of the kiln 7 without added higher temperature gases, such gas would be at a temperature within a range that causes condensation of vaporized tars (see FIG. 3). A second gas stream is generated in an atmosphere of air and steam after the coal has been heated above about 1,600° F. and converted to char. This second gas is discharged from the solids discharge end 11 of the kiln 7, at relatively high temperature (1,900° F.) and substantially tar-free. Heat can be recovered from this tar-free gas and steam generated by the heat exchanger 53 after only a simple cleaning of particulate matter, as may be provided by the cyclone separator 48. The discharge of gas out the solids inlet end 10 of the kiln 7 and the gas discharged out the solids discharge end 11 of the kiln 7, is adjustably proportioned relative to each other by adjusting valves 40, 47 so that at least some 1,900° F. tar-free gas will mix with the tar-containing gas flowing toward the material end 10 of kiln 7, with such higher temperature gas being in an amount sufficient to keep such mixed gases at a temperature of about 1,000° F., which is high enough to avoid the tars condensing on equipment surfaces (i.e., of the kiln, gas escape valves, etc.). FIG. 3 shows that there is very little condensation of tars over 700° F. However, even a little condensation of tar over an extended period of time will result in significant build-up of tar deposits on the lining of kiln 7 and within valves 40, 47 such as to interfere with proper operation of equipment to perform the process. For trouble-free operation for long periods of time, a discharge temperature of gases from the solids inlet end 10 of kiln 7, of about 1,000° F. has been determined to indicate a preferred mix of the two gas streams. It should be noted, however, that if gases are discharged from the solids inlet end 10 of kiln 7 at temperatures much higher than necessary to prevent condensation of tar on equipment surfaces, it would mean that high temperature gas is needlessly drawn away from the gas stream from which heat can be recovered after only the simple particulate cleaning by the cyclone separator 48.

The operation of the process can be further explained with reference to FIG. 4 which shows a plot of overbed gas temperatures and bed temperatures, relative to solids travel from the solids inlet end 10 of kiln 7 to the solids discharge end 11 of kiln 7.

Figure 4:
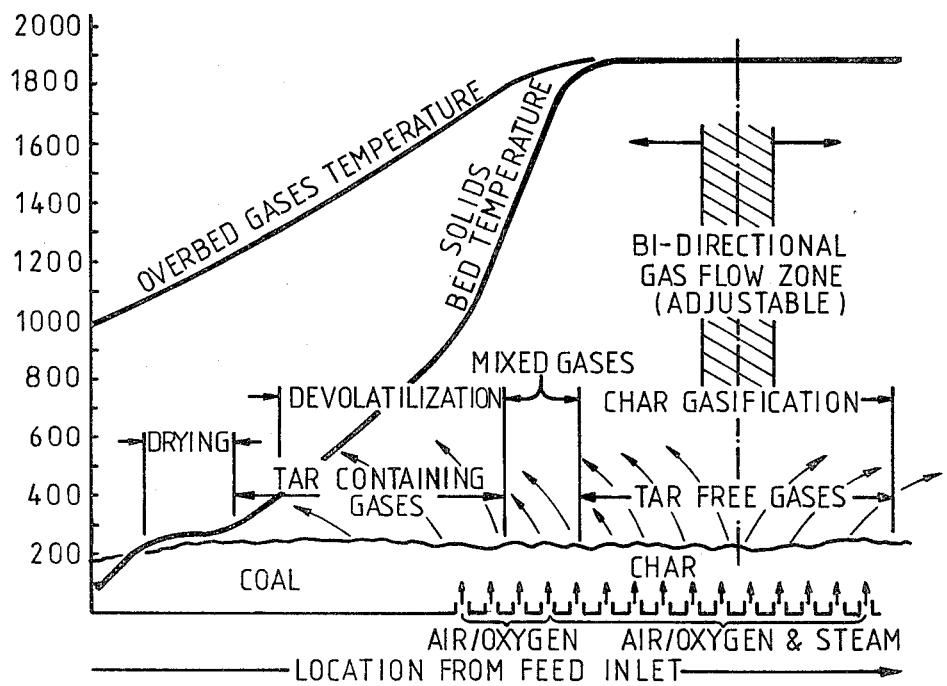
FIG. 4 is a graph depicting temperature changes of both solid carbonaceous material particles being gasified and over-bed gases, as the solid particles travel through the kiln.

FIG. 4 shows that solid coal particles moving through kiln 7 are dried as particle temperature is raised from about 200° F. to about 300° F. When the coal particles are heated to about 400° F. and above and pass over air-only ports 29, the coal begins to devolatilize, giving off a tar-containing gas (sometimes called "coal gas") which will be substantially completely educted from the coal by the time the coal is heated to 1,600° F. or somewhat higher. Complete eduction of volatiles converts the coal to char. As the char is raised in temperature, in the air-steam atmosphere provided by steam flow through the passages 33 in FIG. 1, and reaches a temperature of about 1,600° F. and above, the char gives off a tar-free gas (sometimes called "water gas").

With kiln 7 operating under pressure, opening the valves 40, 47 (shown in FIG. 1) permits and controls gas discharge from both ends of kiln 7. Valves 40, 47 are opened to discharge all of the tar-containing gas plus at least some portion of the tar-free gas from the bi-directional gas flow zone indicated by the shaded area in FIG. 4.

As is shown in FIG. 4, the temperature of the tar-containing gas drops in temperature rather rapidly as it flows toward the solids inlet end 10 of kiln 7 and preheats incoming coal flowing and tumbling toward the solids discharge end 11 of kiln 7. Except for withdrawing some tar-free gas from the shaded zone of FIG. 4 out the solids inlet end 10 along with the tar-containing gas, the gases discharged from the solids inlet end 10 would be cooled below 1,000° F. with tar condensing consequences indicated by the plot in FIG. 3. The exact setting of valves 40, 47 (shown in FIG. 1) at any point in time, will be such as to maintain gas discharge temperature from the solids inlet end 10 of kiln 7 at a target temperature, e.g. about 1,000° F., to avoid condensation of tar on equipment surfaces. For most and perhaps all coals, maintaining the aforesaid target temperature of about 1,000° F., will also insure the solids discharge end 11 off-gas remaining free of tars, so that heat can be recovered from that gas steam by heat exchanger 53 after only a particulate cleaning by cyclone 48 and before passing to the scrubber 54 and $H_2S$ removal system 52. However, another parameter for monitoring the solids discharge end 11 off-gas to make sure it is tar-free, is to measure the methane content of such gas.

As has been hereinbefore explained, devices are commercially available to monitor methane content and a methane content of from zero to perhaps about 0.1% indicates that tars are not likely present.

From the foregoing, it can be seen that the present invention provides a process for maximizing the production of fuel gas heating values as latent chemical energy releasable as thermal energy upon combustion of the fuel gas while avoiding condensation of tars in a gas stream discharged from the solids feed end of the kiln.

Other advantages of the process according to the present invention will be apparent from the hereinafter described examples with regard to gasifying particular carbonaceous materials.

EXAMPLES

Example I with Illinois #6 Coal

| Proximate Composition | |
|---|---|
| Moisture | 12.0% |
| Volatile Matter | 33.3% |
| Fixed Carbon | 41.7% |
| Ash | 13.0% |
| Elemental Composition, Moisture and Ash Free | |
| Sulfur | 5.3% |
| Hydrogen | 5.1% |
| Carbon | 75.5% |
| Nitrogen | 1.2% |
| Oxygen | 12.9% |

Operating Parameters and Results
Pounds of feed end off-gas per pound of coal fed to kiln = 2.0

| | | Lbs/hr | degrees F. |
|---|---|---|---|
| (a) | Coal | 417 | 70 |
| (b) | Ash | 64 | 1,900 |
| (c) | Solids feed end off-gas | 1,133 | 1,000 |
| (d) | Solids discharge end off-gas | 391 | 1,900 |
| (e) | Ratio of (c) to (d) | 3 to 1 | |
| (f) | Steam | 234 | 475 |
| (g) | Air | 937 | 475 |

Example II with Pittsburgh #8 Coal

| Proximate Composition | |
|---|---|
| Moisture | 4.4% |
| Volatile Matter | 39.5% |
| Fixed Carbon | 48.6% |
| Ash | 7.5% |
| Elemental Composition, Moisture and Ash Free | |
| Sulfur | 3.8% |
| Hydrogen | 5.7% |
| Carbon | 82.7% |
| Nitrogen | 1.6% |
| Oxygen | 6.2% |

Operating Parameters and Results
Pounds of solids feed end off-gas per pound of coal fed to kiln = 2.7

| | | lbs/hr | degrees F. |
|---|---|---|---|
| (a) | Coal | 358 | 70 |
| (b) | Ash | 32 | 1,900 |
| (c) | Solids feed end off-gas | 956 | 1,000 |
| (d) | Solids discharge end off-gas | 541 | 1,900 |
| (e) | Ratio of (c) to (d) | 2 to 1 | |
| (f) | Steam | 234 | 475 |
| (g) | Air | 937 | 475 |

Example III with Wyoming Powder River sub-bituminous Coal

| Proximate Composition | |
|---|---|
| Moisture | 30.4% |
| Volatile Matter | 31.1% |
| Fixed Carbon | 32.1% |
| Ash | 6.4% |
| Elemental Composition, Moisture and Ash Free | |
| Sulfur | 0.8% |
| Hydrogen | 5.5% |
| Carbon | 75.7% |
| Nitrogen | 1.0% |
| Oxygen | 17.0% |

Operating Parameters and Results
Pounds of solids feed end off-gas per pound of coal fed to kiln = 3.1

| | | lbs/hr | degrees F. |
|---|---|---|---|
| (a) | Coal | 542 | 70 |
| (b) | Ash | 44 | 1,900 |
| (c) | Solids feed end off-gas | 1,669 | 1,000 |
| (d) | Solids discharge end off-gas | 0 | |
| (e) | Ratio of (c) to (d) | 100% | |
| (f) | Steam | 234 | 475 |
| (g) | Air | 937 | 475 |

From the foregoing detailed description of the present invention and examples of its operation, it has been shown how the objects of the present invention have been attained in a preferred manner. However, modification and equivalents of the disclosed concepts such as readily occur to those skilled in the art are intended to be included in the scope of this invention. Thus, the scope of the invention is intended to be limited only by the scope of the claims such as are, or may hereafter be, appended hereto.

The embodiments of the invention in which an exclusive property or privilege is claimed are defined as follows:

1. A dry process for continuously gasifying unsized particles of coal which upon being progressively heated to a final temperature of approximately 2,000° F. through heat treatment stages in which the coal gives off a combustible mixture of gases containing water vapor, hydrogen, carbon monoxide, carbon dioxide, hydrocarbon vapors (tar-laden) and smoke (aerosols) and hydrocarbon-free gases (tar-free) at 1,600°–2,000° F. in a final and highest temperature stage of said series of stages, with said treatment stages each being achieved in zone within a rotary kiln inclined downwardly from a material inlet toward a material outlet, the process comprising the steps of:

(a) feeding a continuous supply of said coal to the inlet to form a bed of the coal in the kiln, and rotating the kiln to advance the bed from the inlet to the outlet of the kiln;

(b) increasing the temperature of the bed progressively as the coal is advanced through said heat treatment stages to increase the temperature of the coal in the final stage to approximately 2,000° F. and the temperature of the hydrocarbon-free gases liberated in the final stage to approximately 1,900° F.;

(c) admitting air and steam through the kiln shell and bed of coal where the coal is heated to at least a tar-free gasification temperature and at locations in a plurality of radial planes spaced apart along the central axis of the kiln;

(d) selectively controlling the discharge of a proportion of the process gas from each end of the kiln to split into two streams the tar-free gas produced by air and steam passing through the coal and draw the split tar-free gas streams apart to flow in axially opposite directions within the kiln with one of the tar-free gas streams flowing axially away from the zone in which tar-laden gases emerge from coal heated to devolatilization temperature and toward the material outlet of the kiln for discharge from the kiln as tar-free gas, and with the tar-free gas stream flowing toward the material inlet of the kiln mixing with said emerging tar-laden gases to flush tar-laden gases out the material inlet end of the kiln and away from the stream of tar-free gases flowing toward and out the material outlet end of the kiln; and (e) adjusting the proportion of process gases discharged out each end of the kiln to move the location of the tar-free gas flow split along the central axis of the kiln to a position between the beginning of said tar-free gasification stage and the material outlet end of the kiln with said position of the split selected to maintain a maximum attainable flow of tar-free gas out the material discharge end of the kiln while maintaining the temperature of the mixed gases flowing out the material feed end of the kiln at above tar condensing temperature.

2. A process according to claim 1 in which the temperature of the bed is increased progressively as the coal is advanced through said heat treatment stages, with oxidizing fluid containing steam being admitted to at least that portion of the bed that has been heated approximately 1,600° F. to further increase the temperature of the material in the final stage to approximately 2,000° F. and the temperature of the hydrocarbon-free gases liberated in the final stage to approximately 1,900° F.

3. A process according to claim 1 in which the escape of gases from the material inlet end of the kiln is adjusted to increase and the escape of gases from the material discharge end of the kiln is adjusted to decrease, upon the temperature of gases escaping the material inlet end of the kiln dropping below 1,000° F., and such adjustments are made to the extent that the temperature of gases escaping the material inlet end of the kiln, is thereby established and maintained at approximately 1,000° F.

4. A process according to claim 1 in which said progressive heating produces hydrocarbon vapors and smoke (aerosols) containing vaporized tar and methane and the escape of gases simultaneously from each end of the kiln is adjusted to discharge gas toward and out the material inlet of the kiln in an amount that the level of methane in the approximately 1,900° F. gases discharged from the material discharge end of the kiln, is maintained at no more than about 0.1 percent by volume as an indication of an essentially complete absence of vaporized tar in gases discharged from the material discharge end of the kiln.

5. A process according to claim 1 in which the escape of gases simultaneously from each end of the kiln is adjusted to discharge approximately three (3) pounds of gas per hour from the material inlet end of the kiln for each one (1) pound per hour of gas discharged from the material discharge end of the kiln.

6. A process according to claim 1 in which the oxidizing fluids including steam are admitted in the bed of coal through ports in the cylindrical shell of the kiln as the ports are carried beneath the bed of material by the rotation of the kiln; and oxidizing fluid free of steam is admitted in a portion of the bed of coal at temperatures below 1,900° F.

7. A process according to claim 6 in which the ports admit fluids to the interior of the kiln when the ports are moved beneath the bed of coal and fluid flow through said ports is terminated upon said ports emerging from beneath the bed until rotation of the kiln again carries such of the ports beneath the bed.

8. A process according to claim 1 in which oxidizing fluid is pressurized before admission at a level established and maintained to provide a gas pressure within the kiln above and along the entire axial length of the bed of coal, which is at least about 20 pounds per square inch higher than ambient atmospheric pressure external of the kiln.

* * * * *